(12) United States Patent
Sakata et al.

(10) Patent No.: US 8,601,565 B1
(45) Date of Patent: Dec. 3, 2013

(54) WHITE-LIST FIREWALL BASED ON THE DOCUMENT OBJECT MODEL

(71) Applicant: Edgecast Networks, Inc., Santa Monica, CA (US)

(72) Inventors: Jayson G. Sakata, Encino, CA (US); Jacqueline Mak, Encino, CA (US); Alexander A. Kazerani, Santa Monica, CA (US)

(73) Assignee: Edgecast Networks, Inc., Santa Monica, CA (US)

( * ) Notice: Subject to any disclaimer, the term of this patent is extended or adjusted under 35 U.S.C. 154(b) by 0 days.

(21) Appl. No.: 13/939,095

(22) Filed: Jul. 10, 2013

Related U.S. Application Data

(60) Provisional application No. 61/837,166, filed on Jun. 19, 2013.

(51) Int. Cl.
*G06F 21/00* (2013.01)

(52) U.S. Cl.
USPC .......................................................... 726/11

(58) Field of Classification Search
None
See application file for complete search history.

(56) References Cited

U.S. PATENT DOCUMENTS

| | | | |
|---|---|---|---|
| 2005/0198692 A1* | 9/2005 | Zurko et al. | 726/24 |
| 2006/0056317 A1* | 3/2006 | Manning et al. | 370/254 |
| 2007/0153782 A1* | 7/2007 | Fletcher et al. | 370/389 |
| 2008/0120689 A1* | 5/2008 | Morris et al. | 726/1 |
| 2012/0089700 A1* | 4/2012 | Safruti et al. | 709/217 |

\* cited by examiner

*Primary Examiner* — William Goodchild
(74) *Attorney, Agent, or Firm* — Los Angeles Patent Group; Arman Katiraei

(57) ABSTRACT

Some embodiments provide firewalls and methods for guarding against attacks by leveraging the Document Object Model (DOM). The firewall renders the DOM tree to produce a white-list rendering of the data which presents the non-executable elements of the data and, potentially, outputs of the executable elements of the data without the executable elements that could be used to carry a security threat. Some embodiments provide control over which nodes of the DOM tree are included in producing the white-list rendering. Specifically, a configuration file is specified to white-list various nodes from the DOM tree and the white-list rendering is produced by including the DOM tree nodes that are specified in the white-list of the configuration file while excluding those nodes that are not in the white-list. Some embodiments provide a hybrid firewall that executes a set of black-list rules over white-listed nodes of the DOM tree.

21 Claims, 13 Drawing Sheets

WHITE-LIST FIREWALL BASED ON THE DOCUMENT OBJECT MODEL

CLAIM OF BENEFIT TO RELATED APPLICATIONS

This application claims the benefit of U.S. provisional application 61/837,166, entitled "Whitelist Firewall Based on the Document Object Model", filed Jun. 19, 2013. The contents of Provisional Application 61/837,166 are hereby incorporated by reference.

TECHNICAL FIELD

The present invention relates to systems and methods for online security and, more specifically, to firewalls.

BACKGROUND ART

FIG. 1 depicts an exemplary Content Delivery Network (CDN) architecture. As shown, the CDN includes several different caching Points-of-Presence (PoPs) 110, traffic management servers 120, and an administrative server 130. The figure also illustrates the interactions that CDN customers, including content providers, have with the CDN and interactions that content consumers or end users have with the CDN.

Each PoP 110 may be representative of a server farm for a geographically proximate set of physically separate servers or a set of virtual servers that execute over partitioned sets of resources of one or more physically separate servers. The PoPs are distributed across different network edges of the Internet. The servers in each respective PoP cache and serve content on behalf of different content providers to end users, thus facilitating the "last mile" delivery of content. Hence, the PoP servers are referred to as "edge servers" or "caching servers". An edge server may cache the same content as other edge servers in the same PoP or may be configured to cache different content than the other edge servers in the same PoP.

The traffic management servers 120 route end users, and more specifically, end user issued requests for content to one or more edge servers that can optimally deliver the requested content back to the end users. In many cases, the optimal edge server is a server caching the requested content in a PoP that is geographically closest to the end user that issued the content request. Different CDN implementations utilize different traffic management schemes to achieve such routing to the optimal edge servers. For example, the traffic management scheme can be conducted according to Anycast routing. However, it should be apparent that other traffic management schemes, such as Domain Name System (DNS) routing, can alternatively be used and that the traffic management servers 120 can include different combinations of DNS servers, load balancers, and routers performing Anycast, DNS, or Border Gateway Protocol (BGP) routing as some examples.

The administrative server 130 may include a central server of the CDN or a distributed set of interoperating servers that perform the configuration control and reporting functionality of the CDN. Content providers register with the administrative server 130 in order to access services and functionality of the CDN. Accordingly, content providers are also referred to as customers of the CDN. Once registered, content providers can interface with the administrative server 130 to specify a configuration, upload content, and set security parameters. The administrative server 130 also aggregates statistics data from each server of the set of edge servers and processes the statistics to produce usage and performance reports for the customers. From these reports, the content provider can better understand the demand for its content, the performance provided by the CDN in delivering the content provider's content, and the need for capacity reallocation, among other uses.

CDNs, like any online entity, can be a target for cyber-attacks. Cyber-attacks can have many incarnations. Some examples include masking and passing of virus-embedded code or content, Distributed Denial of Service (DDOS) attacks, account hacking attacks, cross-site scripting attacks, and SQL injection attacks.

The ramifications of a cyber-attack can be more severe if successful on the CDN as they can have trickle-down consequences. Specifically, any attack that is intended for one of the CDN content provider customers can degrade the CDN performance for other content provider customers. This is because an attack that is intended for one CDN content provider customer will usually find its way to the CDN's servers that deliver other customer content. Consequently, if the attack is successful, it will not only take down or degrade the performance of the intended content provider site, but sites of other content providers that rely on the same CDN resources under attack.

One common counter-measure to cyber-attacks is the firewall. Firewalls typically operate by way of a set of rules. These rules can be expressed as regular expressions or through other syntax. The function of the rules is to identify malicious data and the function of the firewall is to use the rules to prevent such malicious data from passing through the firewall thereby preventing the malicious data from affecting the systems that would execute or otherwise process the malicious data. The malicious data can be in the form of code, text, scripts, files, or multi-media content (e.g., audio, video, images) as some examples. Accordingly, a firewall typically operates to identify and restrict "black-listed" data.

However, rule-based black-list firewalls remain vulnerable, especially in their application towards a CDN. A rule has to be configured for each attack that is to be thwarted. New attacks are invented everyday and such new attacks will be successful until identified and a rule is configured to combat those new attacks. Accordingly, the attackers are typically one step ahead of the firewall. Also, attackers can modify their attacks to work-around firewall rules. For example, a firewall rule may be configured for a specific variant or permutation of a known attack. Once the attacker becomes aware of how the firewall operates, he can attack using a different variant or permutation of the attack that does not fall within the rule definition and is therefore not restricted by the firewall. In other words, unless a firewall rule is explicitly set to combat a particular attack, that particular attack will pass through the firewall undetected.

This cat-and-mouse dynamic is made worse for the CDN, because the CDN is responsible for the content of numerous content provider customers and must defend all such customers from attacks. In other words, the CDN is subject to a higher volume of attacks simply because it must defend a greater number of resources that are attack targets.

Another shortcoming of black-list firewalls is the sheer number of rules that are needed to account for all known types of malicious data. The list of rules is thus an ever growing list. Consequently, it is not uncommon for a firewall to be configured with hundreds, if not, thousands of rules. Each piece of data passing through the firewall is thus subject to each of the defined rules. For every new rule that is configured, additional processing overhead is added at the firewall with each unit of overhead degrading performance. This issue is again exacerbated for the CDN. A CDN firewall must be able to implement and process many different rule sets. Each rule set can be defined by a different content provider customer with each content provider customer rule set specifying hundreds or thousands of custom rules for attacks that the particular customer is at risk for. Accordingly, data passing through the CDN can be subject to all customer rule sets. Alternatively, data passing through the CDN can be subject to a specific customer's rule set that is selected from all customer rule sets, wherein selecting the specific customer's rule set involves inspecting the data to identify the customer to which it pertains and then retrieving that specific customer's rule set. Another alternative is to specify a default rule set for all CDN customers. However, such a rule set needs to be extensive and comprehensive, and, in many cases, can impose unnecessary overhead for various content provider customers. For example, the MODSecurity module is an open source web application firewall providing over 15,000 configurable rules.

Accordingly, there is a need for a scalable CDN firewall solution that combats some new threats without the need for a specific rule definition for those threats. There is also a need for a firewall solution that does not increase in overhead or complexity as new threats are identified and combated, but one that requires a constant amount of resources to operate and is therefore adapted for the large volume of data and attacks that a CDN experiences. In summary, there is a need to restrict malicious data via means other than configured black-lists.

SUMMARY OF THE INVENTION

Some embodiments provide firewalls and computer-implemented methods for firewalls that perform a white-list screening of data by leveraging the Document Object Model (DOM). In some such embodiments, the firewall parses data that it receives and produces a DOM tree representation of the data, wherein different elements of the data are organized and structured to different nodes in the DOM tree. The firewall then renders the DOM tree. In rendering the DOM tree, the firewall traverses the nodes of the DOM tree, executing any nodes containing executable data elements and formatting any nodes containing non-executable data elements. Consequently, the firewall effectuates any threats or attacks contained in the executable data elements such that the threats or attacks are isolated and rendered harmless at the firewall. As a result, the firewall produces a white-list rendering of the data which presents the non-executable elements of the data and, potentially, some outputs of the executable elements of the data in a formatted representation, wherein the formatted representation resembles a web browser rendering of the data. The firewall then reconstructs the data from the white-list rendering and passes the reconstructed data to the intended recipient.

To provide greater flexibility in the white-list firewall operation, some embodiments provide control over which nodes of the DOM tree are included (i.e., white-listed) in producing the white-list rendering. In some such embodiments, a configuration file is specified to white-list various nodes from the DOM tree. The firewall loads the configuration file. When data is received at the firewall, the firewall parses the data to construct the DOM tree. The firewall traverses the DOM tree to include the nodes that are specified in the white-list of the configuration file while excluding those nodes that are not in the white-list. The firewall then produces the white-list rendering by reconstructing the data from the data elements contained in the white-listed nodes of the DOM tree. The reconstructed data is then passed to the intended recipient.

Some embodiments provide a hybrid firewall that executes a set of black-list rules over white-listed nodes of the DOM tree. Specifically, the hybrid firewall permits users to white-list certain nodes from the DOM tree and define granular black-list rules (i.e., regular expressions) to identify permissible data within the white-listed DOM nodes. Such functionality can be used to combat threats that are hidden within otherwise permissible data elements. The hybrid implementation also allows for greater security flexibility without significantly increasing complexity. This is because a firewall administrator configures black-list rules to apply against the data elements contained in the white-listed DOM nodes as opposed to all data elements of a particular data instance. In so doing, the firewall administrator reduces the number of data elements that are processed using the black-list rules and also reduces the number of black-list rules that are needed, since the black-list rules need to protect against threats or attacks that can affect the smaller subset of white-listed data elements rather than all data elements.

For a CDN architecture, the white-list or hybrid firewalls of some embodiments can be configured on a per CDN customer basis. Each particular CDN customer can create a firewall configuration file that is used to filter data targeted for that particular CDN customer. The firewall configuration file identifies different DOM nodes that the particular CDN customer has white-listed, and optionally, black-list rules to apply over the white-listed DOM nodes. Accordingly, when the firewall receives data targeting a particular CDN customer, the firewall can retrieve the firewall configuration file specified by that particular CDN customer and customize the firewall operation according to the retrieved firewall configuration file for that particular CDN customer.

The firewalls of some embodiments can be implemented within each edge server of a CDN or at a gateway that provides access to the CDN edge servers. Alternatively, the firewalls can be separate servers operating in conjunction with the CDN edge servers.

BRIEF DESCRIPTION OF THE DRAWINGS

In order to achieve a better understanding of the nature of the present invention, a preferred embodiment for the white-list firewall will now be described, by way of example only, with reference to the accompanying drawings in which.

DETAILED DESCRIPTION

In the following detailed description, numerous details, examples, and embodiments for a white-list firewall are set forth and described. It will be clear and apparent to one skilled in the art that the firewall is not limited to the embodiments set forth and that the firewall may be practiced without some of the specific details and examples discussed.

I. White-List Firewall Using DOM

Some embodiments provide systems and methods for implementing a white-list firewall. The white-list firewall of some embodiments operates by permitting white-listed elements of data to pass through the firewall. Other elements of the received data that are not white-listed are prevented from passing through the firewall. The term data, as used herein, is broadly defined such that elements of the data can include one or more of code, text, scripts, files, hyperlinks, applications, or multi-media content (e.g., audio, video, images) as some examples. The white-list firewall of some embodiments operates based in part on the Document Object Model (DOM).

Figure 2:
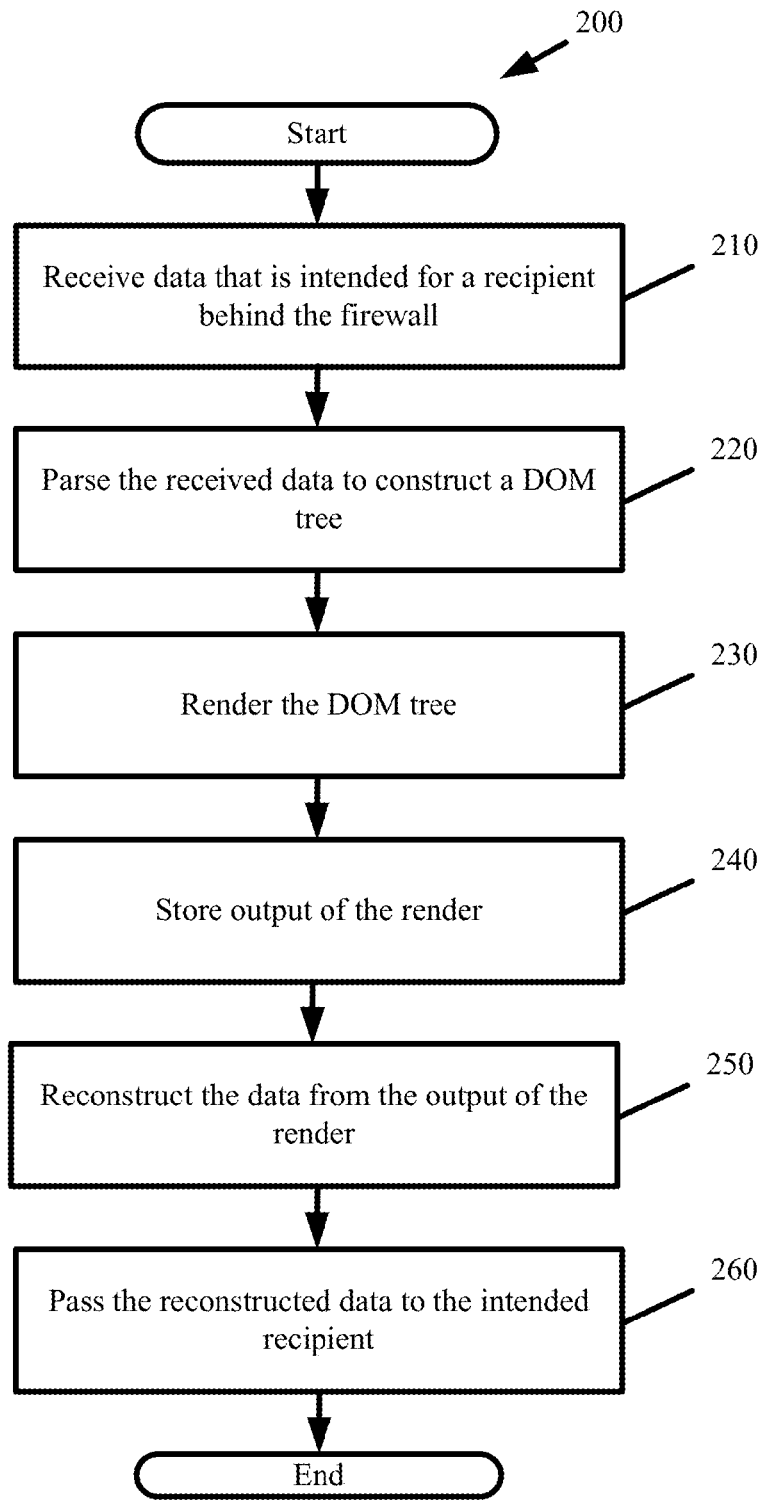
FIG. 2 presents a process describing firewall operation using the DOM in accordance with some embodiments.

FIG. 2 presents a process 200 describing firewall operation using the DOM in accordance with some embodiments. The process commences when the firewall receives (at 210) data that is intended for a recipient behind the firewall. The process parses (at 220) the received data according to the DOM. The parsing yields a DOM tree. The DOM tree organizes and structures the data elements of the data into various nodes.

Next, the process renders (at 230) the DOM tree. Rendering the DOM tree produces a webpage representation of the data as output. In rendering the DOM tree, the firewall executes any executable data elements in the DOM tree, including those that harbor threats or attacks. The threats and attacks will therefore be effectuated against the firewall albeit with no ill affect, as the firewall does not contain the data, operations, or functions that the threats or attacks are intended to compromise. This ensures that any malicious data elements are not carried over to the render output in an executable state, but rather in a rendered state. The rendered state of a threat or attack has no bearing on the render output. In some cases, the rendered state introduces random character sequences as part of the render output.

The process stores (at 240) the render output. The render output is also referred to as the white-list rendering of the data. The firewall reconstructs (at 250) the data from the white-list rendering. The reconstructed data is then passed (at 260) to the intended recipient where it can safely be used for data collection or client-server interaction.

Figure 3:
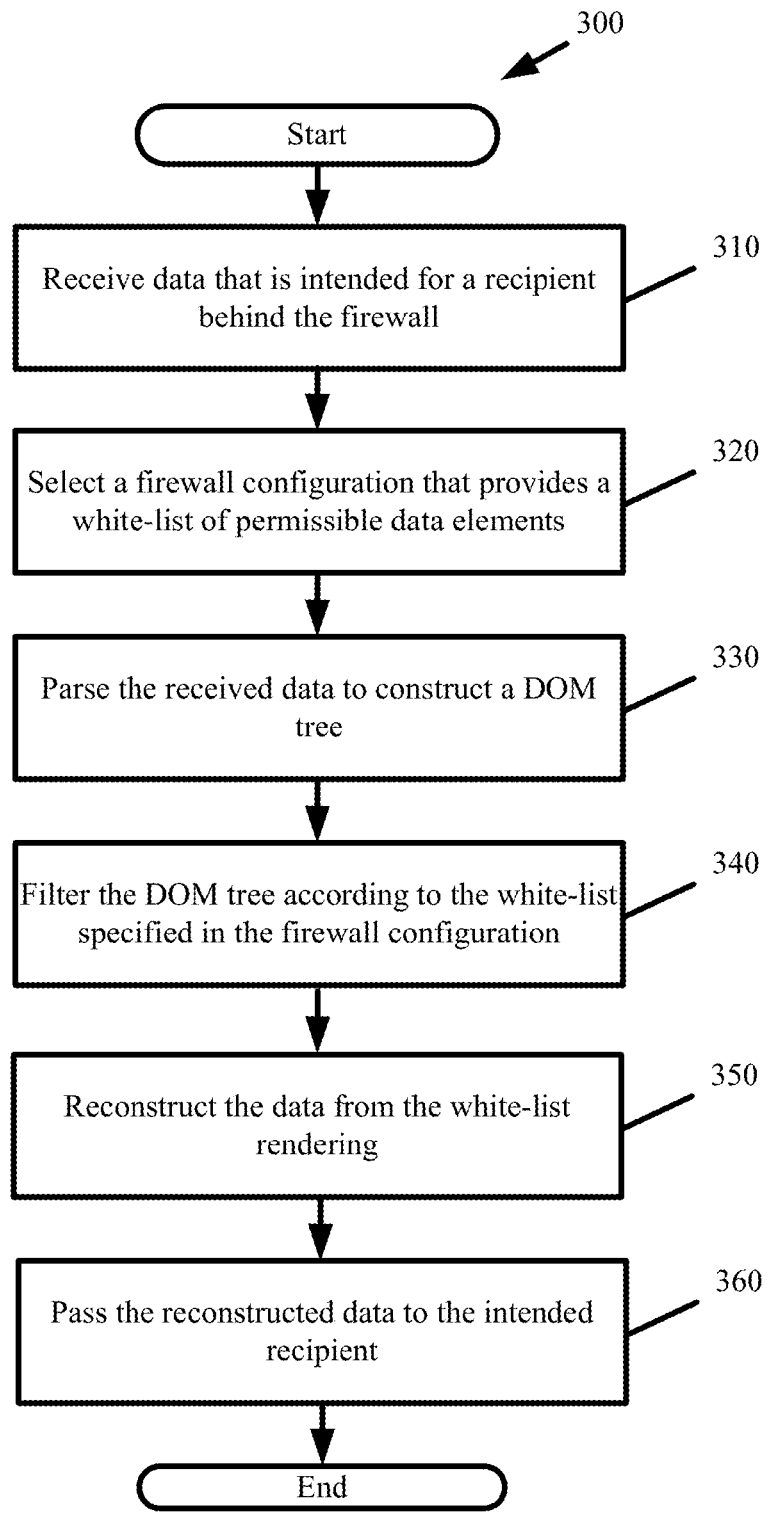
FIG. 3 presents a process describing firewall operation using a white-list of DOM tree nodes in accordance with some embodiments.

Process 200 is effective in blocking many of the threats and attacks that online entities face, because it is over-inclusive in its protection. Various data elements besides those that harbor threats and attacks are prevented from passing through the firewall, thus allowing the white-list firewall to combat unknown or new threats that may arise in the future. To provide greater flexibility in the white-list firewall operation, some embodiments provide control over which nodes of the DOM tree are included (i.e., white-listed) in producing the white-list rendering. FIG. 3 presents a process 300 describing firewall operation using a white-list of DOM tree nodes in accordance with some embodiments.

The process 300 begins by receiving (at 310) data that is intended for a recipient behind the firewall. The process selects (at 320) a firewall configuration that provides a white-list of permissible DOM tree nodes. The process may select a default firewall configuration or a particular firewall configuration from a plurality of different firewall configurations based on the received data. In this manner, the operation of the firewall can be customized based on the received data. Such customization is desired in a CDN, whereby different CDN customers can configure different white-lists to be used with their data and the CDN reconfigures the firewall operation by selecting a particular customer's firewall configuration when the received data is intended for or includes data of that particular customer.

The process parses (at 330) the received data. As part of the data parsing, the process constructs a DOM tree with nodes to organize and structure the elements of the received data.

The process filters (at 340) the DOM tree according to the white-list specified in the firewall configuration. The filtering involves including those DOM nodes that are specified within the white-list and excluding those DOM nodes that are not specified within the white-list. The firewall/white-list configuration may identify the white-listed DOM nodes by enumerating one or more DOM nodes, DOM node types, or DOM node attributes. In some embodiments, enumerating a DOM node involves specifying the node name or node value, wherein the node name can be the tag (e.g., HTML tag or XML tag) for the data element that is represented by the node (e.g., <script>, <iframe>, <img>, <a>, etc.). The DOM nodes in the white-list are deemed safe and are to be included in the white-list rendering of the data, whereas the DOM nodes not in the white-list are excluded because they are either unnecessary or they can be used to harbor an attack (e.g., cross-site scripting or SQL injection attack).

Instead of rendering the DOM tree as performed in process 200, process 300 produces (at 350) the white-list rendering of the received data by reconstructing the data from the filtered DOM tree. The process then passes (at 360) the reconstructed data to the intended recipient.

For the white-list firewalls of some embodiments, a rendering engine is provided to parse the received data, produce the DOM tree that represents the received data, and render the DOM tree to generate the white-list rendering. The rendering engine retrieves data that is received at the firewall. The rendering engine then commences the parsing operation. In some embodiments, the rendering engine and the parsing operation that it performs is based on the Webkit or Gecko web browser engines.

In some embodiments, the parsing operation differs depending on the type of data being processed. Disclosure is provided for the primary use case of parsing HyperText Markup Language (HTML) data. However, it should be apparent to one of ordinary skill in the art that the rendering engine and, more specifically, the parsing operation of the rendering engine can be performed on other data types including the Extensible Markup Language (XML) and XHTML data types as some examples.

The parsing operation begins by breaking the input data into its elements. The parsing is performed according to the deterministic grammar and syntax rules for the input data. For HTML data, the parsing operation identifies start tags in the HTML data, breaks each tag into an element, and constructs the nodes of the DOM tree from the identified elements. The parsing operation continues until the input data is completely traversed. The grammar and syntax of HTML are defined in the World Wide Web Consortium (W3C) specifications. The current version of the grammar and syntax is HTML4.

Figure 4:
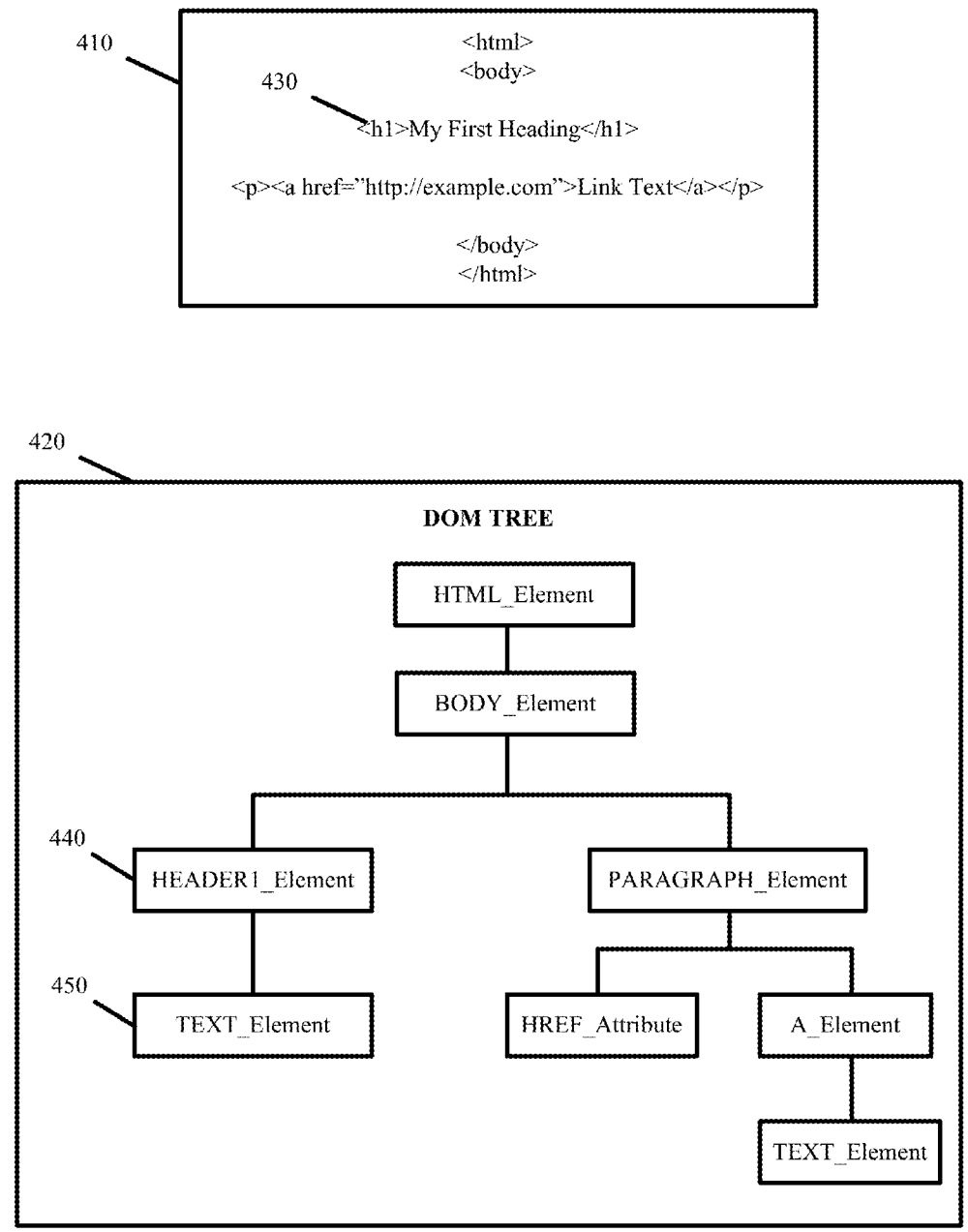
FIG. 4 illustrates the construction of a DOM tree based on a parsing of HTML input data in accordance with some embodiments.

FIG. 4 illustrates the construction of a DOM tree based on a parsing of HTML input data in accordance with some embodiments. The figure illustrates HTML code block 410 and the DOM tree 420 that is constructed from the HTML code block 410. As can be seen, each HTML tag is deconstructed to one or more data elements that are then represented by one or more corresponding nodes in the DOM tree. The nodes preserve the organization and structure of the tags or elements within the HTML code block 410. For example, the "H1" tag 430 is represented by a "HEADER1_Element" node 440 as well as a "TEXT_Element" node 450 in the DOM tree. The node 440 is used to store the formatting and attributes associated with the H1 tag 430, whereas the node 450 is used to store the plain text that is presented as part of the H1 tag 430.

Figure 5:
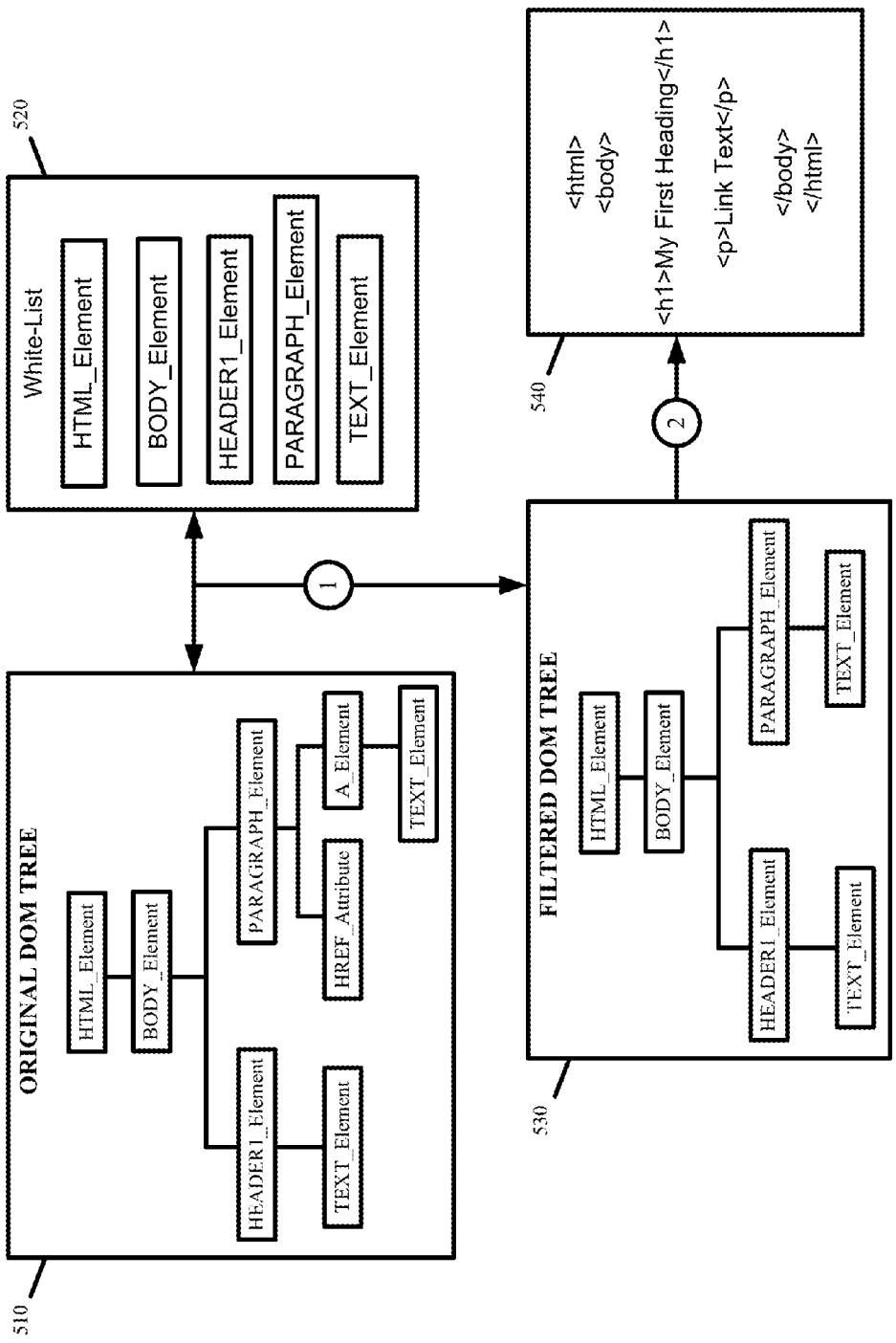
FIG. 5 illustrates producing a white-list rendering of content from a DOM tree and a DOM node white-list in accordance with some embodiments.

FIG. 5 illustrates producing a white-list rendering of content from a DOM tree and a DOM node white-list in accordance with some embodiments. FIG. 5 presents a DOM tree 510, a DOM node white-list 520, a filtered DOM tree 530, and data 540 that is reconstructed from the filtered DOM tree 530 to exclude data elements that are not within the white-list.

The DOM tree 510 is constructed from the HTML code block 410 that is presented in FIG. 4. In FIG. 5, the DOM tree 510 is analyzed according to the DOM node white-list 520. The DOM node white-list 520 includes the DOM nodes which are deemed safe for inclusion in the white-list rendering. As shown, the DOM node white-list 520 includes all the DOM nodes of the DOM tree 510 except the DOM node for the "A_Element". In this example, the "A_Element" node is used to store a hyperlink that is embedded with the text "Link Text". The "A_Element" node may be excluded from the white-list, because the recipient is expecting only text. The hyperlink is therefore extraneous data which in some cases could be used to harbor or initiate a cross-site scripting attack (XSS attack). By removing the hyperlink from the filtered DOM tree 530 and thereby, from the reconstructed data 540, such an attack is thwarted by the firewall. In some embodiments, the DOM node white-list 520 identifies white-listed DOM nodes by specifying the node name, node value, node type, or node attribute, wherein the node name can be the tag of the data element represented by the node.

In summary, the firewall administrator may elect to exclude certain DOM nodes from the white-list because threats or malicious data can be embedded or otherwise carried through those specific DOM nodes or because there is no need or purpose for including those DOM nodes as part of the data being transmitted. By excluding these extraneous nodes or data elements from passing through the firewall, the firewall administrator ensures that those nodes or data elements cannot be used in launching an attack regardless of whether or not that is how those nodes or data elements are used.

In some embodiments, the white-list firewall executes a script or process to create the filtered DOM tree 530 from the original DOM tree 510. Such a script or process may individually retrieve the DOM nodes from the DOM tree 510 using a top-down left-right approach and then check to see if the retrieved DOM node is specified in the white-list. If not, the retrieved DOM node is discarded. Otherwise, the retrieved DOM node is entered in the filtered DOM tree 530. For example, the documentElement function can be used to obtain the root DOM node. Then using the root DOM node, the entire DOM tree can be traversed with the type of the DOM node being compared against those listed in the white-list.

This white-list approach to firewalls is particularly effective against cross-site scripting attacks. The white-list approach is also effective against SQL injection attacks and various other attacks. As one example, a content provider may submit to an end user, a page that requests user identification information including a name, address, email, and telephone address from the end user. The end user may then return the page with a snippet of javascript in the name field, wherein the javascript contains malicious code that is intended to compromise the content provider site. The user can attempt injecting different variations of the malicious code in order to circumvent black-list rules that are defined for identifying specific variants of the malicious code. Some variants of launching the same cross-side scripting attack are provided below, wherein XSS represents the malicious code:

<IMG SRC="jav ascript:alert('XSS');">
<IMG SRC="jav&#x09;ascript:alert('XSS');">
<IMG SRC="jav&#x0A;ascript:alert('XSS');">

Accordingly, with the black-list approach, one or more rules must be defined to account for these and other variants of launching attacks using javascript. In other words, the regular expression defining the black-list rule cannot simply look for the word javascript. The regular expression needs to account for the inclusion of white space, tabs, embedded newline breaks, embedded carriage returns, and other characters that attempt to hide the malicious script from the firewall.

The white-list approaches advocated herein provide a more simple and more effective means with which to thwart such attacks. Specifically, since the content provider in this example expects only to receive text in the user's response, the content provider can specify a white-list configuration that includes text nodes of the DOM tree and excludes other nodes. Accordingly, when the end user content is received at the firewall, the firewall constructs the DOM tree by parsing the end user content into its data elements and by creating nodes to contain each of the example variants separate from the textual data elements. Since the white-list configuration in this example white-lists only the textual data element, the malicious code is stripped out from the reconstructed data and the attack is thwarted. Even if the malicious code is not excluded from the DOM tree representation of the data by the white-list configuration, rendering the DOM tree to produce the reconstructed data causes the malicious script to be effectuated at the firewall, such that the malicious code is not carried over in the reconstructed data that passes from the firewall.

Figure 6:
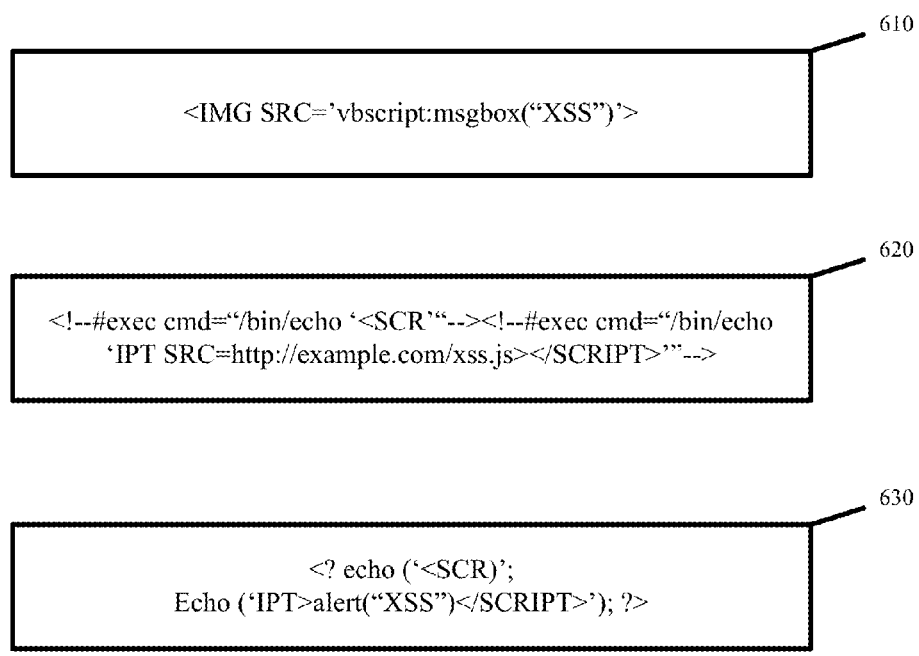
FIG. 6 illustrates three examples of attacks that are intentionally disguised to circumvent black-list rules, but that are thwarted using the white-list approaches of some embodiments.

FIG. 6 illustrates three additional examples of attacks 610, 620, and 630 that are intentionally disguised to circumvent black-list rules, but that are thwarted using the white-list approaches of some embodiments. The first example 610 leverages a Visual Basic script to effectuate an attack by embedding malicious code within a message box. The second example 620 leverages Server Side Includes to effectuate an attack. In this example 620, several shell commands are used to formulate the malicious code which when executed effectuates the attack. The third example 630 leverages the PHP scripting language to effectuate an attack. The black-list approach requires that the launch mechanisms for each of these attacks (i.e., Visual Basic, Server Side Includes, and PHP) and their different variants be identified by one or more rule definitions. The white-list approach of some embodiments nullifies each of these attacks by not including the launch mechanisms in the white-list of acceptable data that can pass through the firewall or by effectuating the attacks at the firewall, such that the malicious code is not carried over in the data that passes through the firewall. Instead, the outputs from effectuating the malicious code may be included with or even excluded from the reconstructed data that passes through the firewall, wherein such outputs have no malicious effect.

In summary, various advantages are realized through the white-list approach to firewalls when compared to traditional black-list approaches to firewalls. First, the white-list firewall can be quickly and easily configured to provide desired security. Conversely, a black-list approach requires that numerous regular expressions be defined to cover all permutations and possibilities with which a threat or attack can be embodied, including consideration of formatting workarounds. Second, the white-list firewall will require a consistent amount of resources to execute, because the process involves the same steps of parsing data, constructing a DOM tree, and reconstructing the data from a white-list rendering of the DOM tree. Black-list firewalls will require a variable amount of resources to execute as a result of the variable number of black-list rules that are applied to the data under analysis. Additionally, the complexity associated with each regular expression can differ. Third, as was noted above, the white-list approach can better combat unknown attacks and malicious data relative to the black-list approach.

II. Hybrid White-List Black-List Firewall

In some embodiments, the white-list firewall can be supplemented to perform a black-list inspection using a black-list set of rules. This provides a hybrid firewall that relies on a white-list to scrub data by excluding data elements that are not in the white-list and that relies on a black-list to scrub data by excluding data elements that match known threats defined in the black-list. As part of this hybrid implementation, the firewall can perform one or both of the white-list functionality described above with reference to FIGS. 2 and 3.

The hybrid firewall provides even more granular security than a pure white-list approach by allowing a deeper inspection of the white-listed data elements or DOM nodes. Specifically, threats that could have been hidden within white-listed rendering of the data can now be detected and removed during the black-list inspection.

Figure 7:
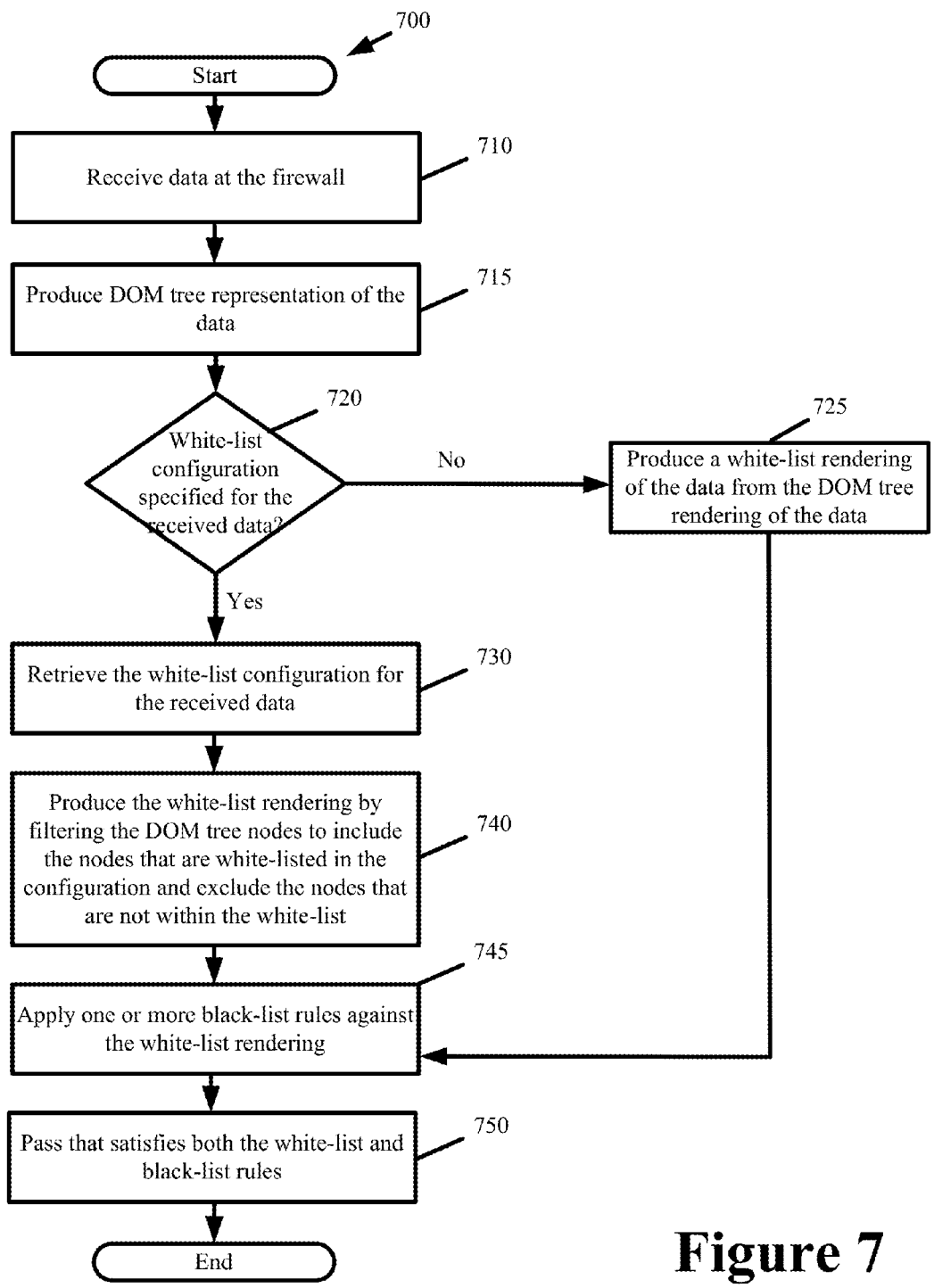
FIG. 7 presents a process demonstrating the hybrid firewall operation in accordance with some embodiments.

FIG. 7 presents a process 700 demonstrating the hybrid firewall operation in accordance with some embodiments. The process commences upon receiving (at 710) at the firewall, data that is intended for a recipient behind the firewall. The process produces (at 715) a DOM tree representation of the data and determines (at 720) whether a white-list configuration has been specified for that data. In the context of a CDN, the determination at 720 may involve identifying which particular content provider CDN customer the received data relates to and identifying if that particular content provider CDN customer has specified a white-list configuration.

If the process determines (at 720) that a white-list configuration has not been specified for the received data, the process produces (at 725) a white-list rendering of the data from the DOM tree rendering of the data. As was noted above with reference to FIG. 2, the DOM tree rendering produces a webpage representation of the data.

If the process determines (at 720) that a white-list configuration has been specified for the received data, the process retrieves (at 730) the specified white-list configuration. This can include retrieving the white-list configuration that was specified by the content provider CDN customer or can include a default white-list configuration if one is specified. As noted above with reference to FIG. 3, the white-list configuration provides a white-list of DOM tree nodes that is used to produce (at 740) the white-list rendering of the data. Specifically, the process filters the DOM tree nodes according to the white-list configuration to include the nodes that are white-listed in the configuration and to prune or otherwise exclude the nodes that are not within the configuration's white-list.

The process continues by applying (at 745) one or more black-list rules against the white-list rendering of the data. This involves removing any residual data elements from the white-list rendering that match to one or more of the black-list rules, wherein each black list rule is defined to identify one or more security threats. Data that satisfies both the white-list and black-list rules is then passed (at 750) from the firewall to the intended recipient.

In some embodiments, the black-list rules are applied to the white-listed nodes of the DOM tree. For instance, the process uses the black-list rules to analyze the data elements within the white-listed nodes and identify those data elements that contain a security threat. When a black-list rule identifies a data element that contains a security threat, the process can prune or remove the DOM tree node that contains that data element or remove the particular data element from the DOM tree node. The process can then reconstruct the data that passes both the white-list inspection and the black-list inspection from the data elements contained by the remaining the DOM tree nodes. Alternatively, when a white-list configuration is not specified for the received data, the process can apply the black-list rules to the output derived from the DOM tree rendering (i.e., the webpage representation). Alternatively or additionally, the process can apply the black-list rules against all data elements stored to all the DOM tree nodes and prune or exclude any nodes that are determined to contain a security threat. The process then renders the remaining DOM tree nodes to produce the webpage representation of the data from which the data is reconstructed.

For the hybrid firewall, each black-list rule can be specified as a regular expression that identifies one or more potential threats or malicious data. The application scope of each black-list rule can also be defined. For example and with reference back to FIG. 5, a black-list rule can be defined to apply over the data element contained within a "TEXT_Element" DOM node, but not the data element contained within a "PARAGRAPH Element" DOM node.

It should be noted that any of the firewall methodologies disclosed above can be combined with other firewall techniques of the prior art. For example, the firewall may be configured with a list of blocked or black-listed IP address. Should data arrive from a source having an IP address within the black-list of IP addresses, that data is blocked at the firewall. If however, the source IP address is not within the black-list, then the firewall performs one of the white-list methodologies presented above. As another example, the firewall may be configured with a list of black-listed protocols. When the firewall receives data encapsulated according to one of the black-listed protocols, the data is blocked at the firewall. Otherwise, the data is processed using one of the white-list methodologies presented above.

III. CDN Application

The firewalls of some embodiments are purposed for CDN usage, though these firewalls have application for individual content providers, enterprises, and any entity operating online. The firewalls lend themselves for CDN use, because they are scalable in that they can protect against an ever increasing number of threats without increased overhead or complexity. The white-list inspection, unlike the black-list inspection, is not a threat-by-threat inspection. Also, the white-list inspection shields the CDN and its content provider customers from unknown and new threats affecting anything (i.e., data or DOM nodes) outside the white-list.

Figure 8:
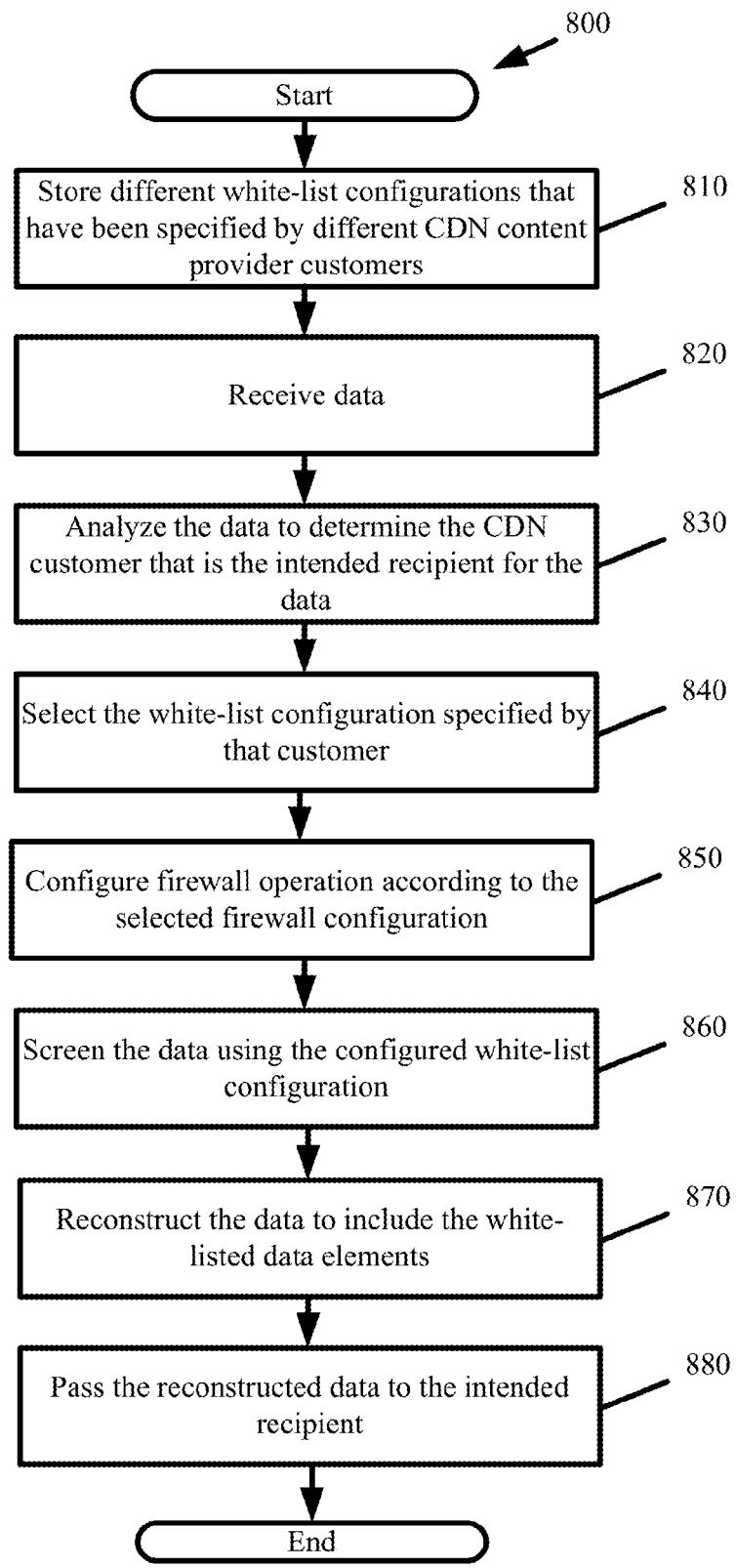
FIG. 8 presents a process describing the customized white-list firewall functionality in accordance with some embodiments.

To accommodate the desire for customized customer security, some embodiments allow each particular CDN customer to specify a custom white-list that the firewall applies for data that targets content of that particular CDN customer. FIG. 8 presents a process 800 describing the customized white-list firewall functionality in accordance with some embodiments.

The process 800 commences by providing the firewall with different white-list configurations to store (at 810). These white-list configurations have been specified by different CDN content provider customers. Specifically, different CDN customers may require different data to be included in the white-list. For instance, an image sharing site would want to permit images to pass through the white-list firewall, whereas an online banking service provider would want to restrict images and other types of multi-media content from being permitted to pass through the firewall. Accordingly, the CDN should on-the-fly configure the firewall white-list to permit images when the inbound data is for the image sharing site and reconfigure the firewall white-list to prevent images when the inbound data is for the online banking service provider. To do so, each CDN customer defines a white-list or firewall configuration file. The white-lists or configuration files are then provided to and stored at the firewall.

The process continues when inbound data is received (at 820). The process analyzes the data to determine (at 830) the CDN customer that is the intended recipient for the data. In some embodiments, the determination is made based on the Uniform Resource Locator (URL) used to route the inbound data. In some embodiments, the CDN customer is identified by locating the domain name of the CDN customer within the URL or from the header of the packets encapsulating the inbound data. In such instances, a URL identifying CDN customer content usually specifies the CDN domain name and a domain name of the CDN customer which is included when the CDN needs to identify the origin. In some embodiments, the CDN customer is identified by locating an identifier for the CDN customer from the URL or from the header of the packets encapsulating the inbound data. The identifier is a CDN provided code for identifying the CDN customer.

Once the CDN determines the customer that the data is intended for, the process selects (at 840) the white-list configuration file specified by that customer. If the firewall configuration file does not exist for the customer or if the customer cannot be identified at step 830, the process selects a default firewall configuration file.

The process configures (at 850) the firewall operation according to the selected firewall configuration file and the inbound data is screened (at 860) accordingly. It should be noted that steps 830-850 can be performed in parallel with the rendering engine parsing and creating the DOM tree so as to minimize any delay with the screening of the inbound data.

The process reconstructs (at 870) the data to include the data elements contained in the white-listed DOM tree nodes. The reconstructed data is passed (at 880) to the edge server tasked with the processing of the CDN customer's data.

Process 800 repeats for newly received inbound data albeit with a different firewall configuration that is specified by the CDN customer whose data at issue. In some CDN architectures, a PoP may include two or more firewall servers and a load balancer consistently distributes subsets of customer data to the same firewall server to minimize the number of firewall configurations that each firewall has to support.

Figure 9:
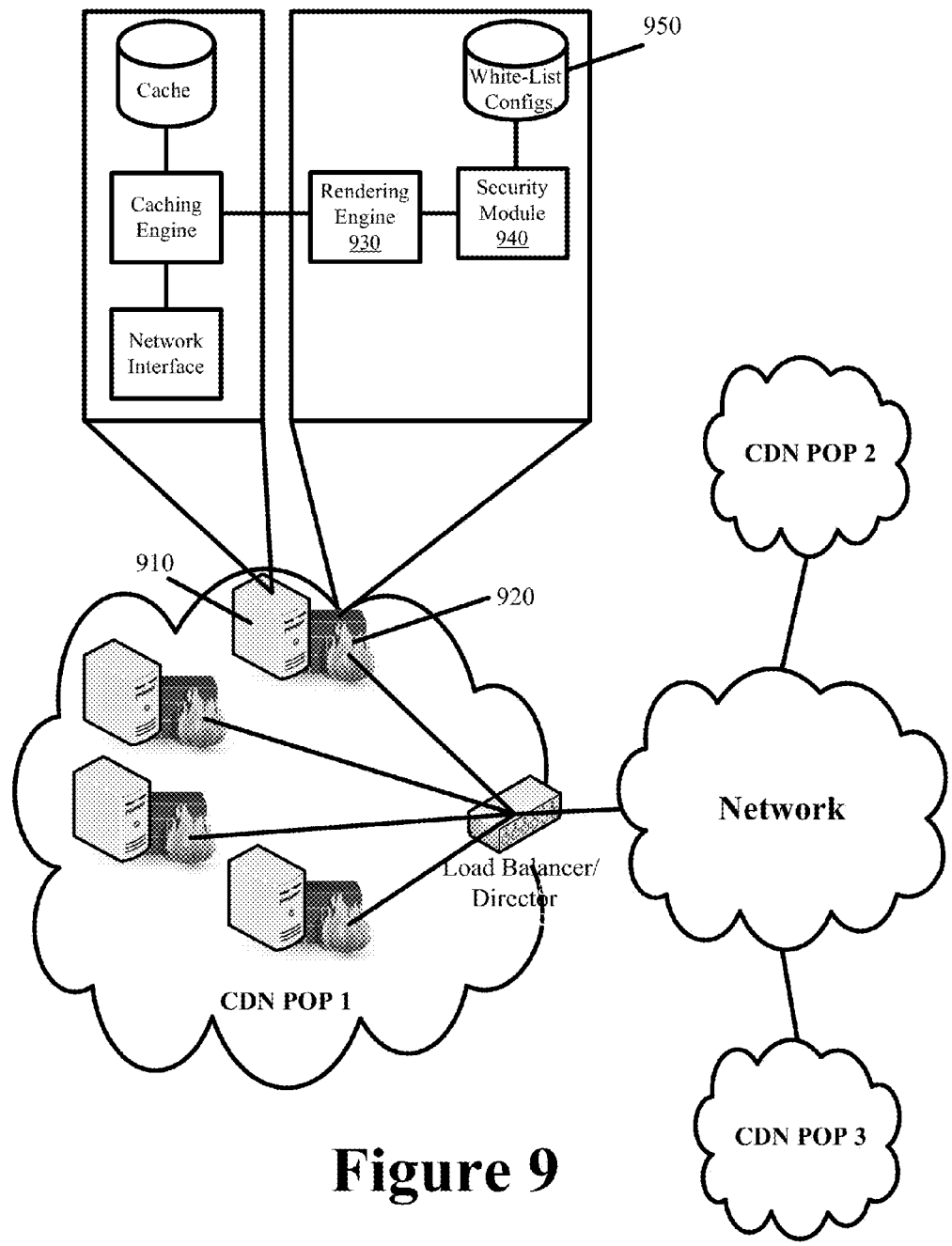
FIG. 9 provides a first integration scheme for incorporating the white-list firewall functionality within a CDN in accordance with some embodiments.

Various integration schemes can be used to incorporate the firewall functionality of some embodiments in a CDN. FIG. 9 provides a first integration scheme for incorporating the white-list firewall functionality within a CDN in accordance with some embodiments. The figure depicts an exploded view for a CDN PoP. As shown, the PoP includes several edge servers. The primary function of the edge servers is to cache content of various CDN content provider customers and to disseminate the cached content on behalf of those CDN content provider customers when requested by end users. In this figure, each edge server 910 is also configured with a firewall component 920.

When a content request or other data is routed from an end user to an edge server 910, the content request or other data is first processed by the firewall component 920 configured for that edge server 910. The firewall component 920 performs a white-list inspection and optional black-list inspection to scrub the data of any threats. The scrubbed data is then passed back to the edge server 910 for processing. Outbound data that is passed from an edge server to end users may also be screened by the firewall component 920 if desired.

As shown, the firewall component 920 is comprised of rendering engine 930, security module 940, and configuration repository 950. The rendering engine 930 performs the data parsing and DOM tree construction. The security module 940 produces the white-list rendering of the data. In some embodiments, the security module 940 produces the white-list rendering by rendering the DOM tree. In some embodiments, the security module 940 produces the white-list rendering by retrieving a white-list configuration from the configuration repository 950 and reconstructing the data based on the nodes of the DOM tree that are white-list in the retrieved configuration. The configuration repository 950 stores the various white-list configurations that different CDN content provider customers define for customized firewall operation. In some embodiments, the configuration repository 950 also stores the black-list rules when the firewall component 920 performs the hybrid functionality.

Accordingly in such an integration scheme, the firewall component 920 runs on the same physical machine as the edge server 910. Consequently, the firewall component 920 and edge server 910 share processing, memory, and storage resources although the machine may be configured with at least two processors, partitioned memory, and different storage mediums to effectively provide independent operation on the same physical machine.

Figure 10:
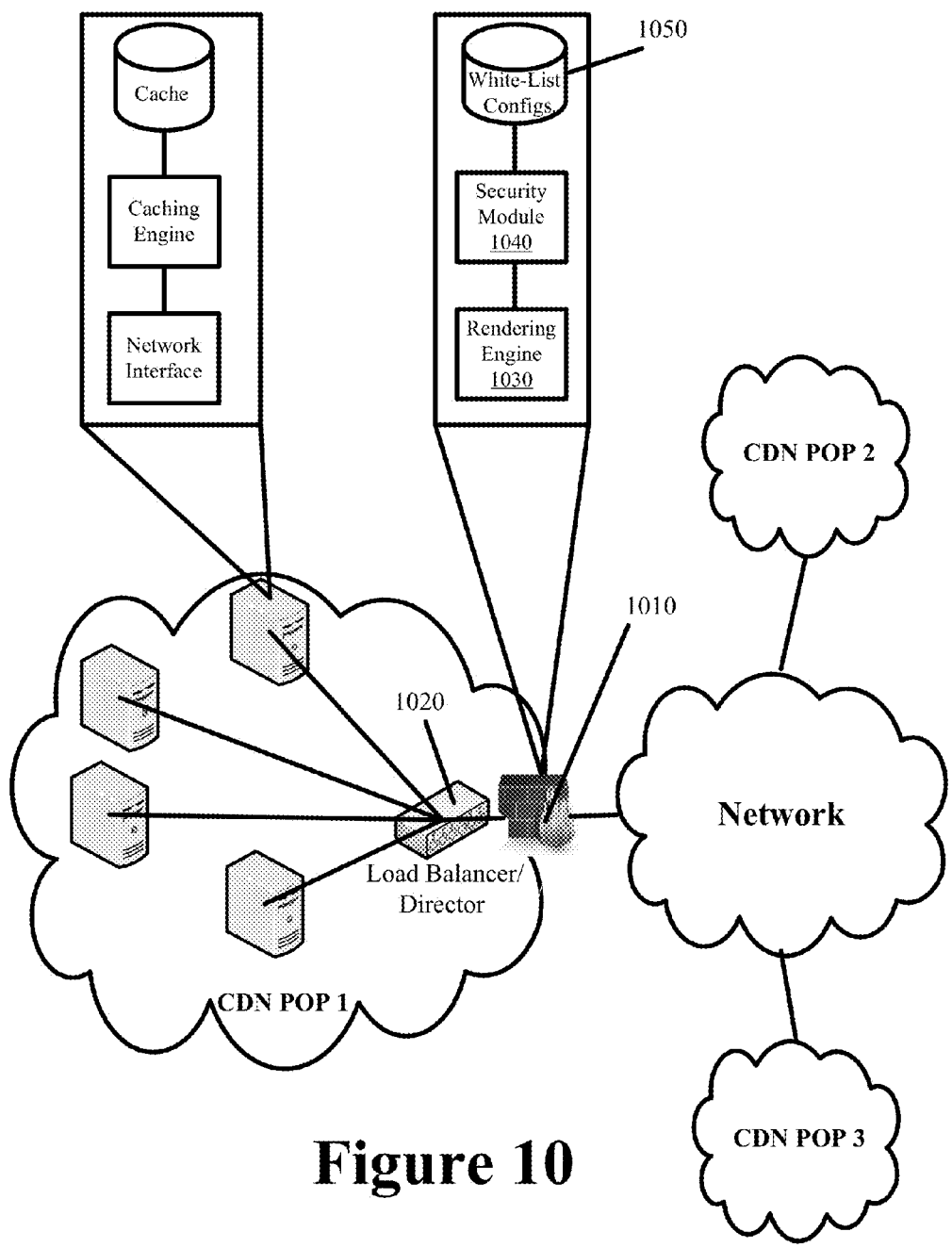
FIG. 10 provides a second integration scheme for incorporating the white-list firewall functionality in a CDN in accordance with some embodiments.

FIG. 10 provides a second integration scheme for incorporating the white-list firewall functionality in a CDN in accordance with some embodiments. In this figure, one or more white-list firewall servers 1010 are placed at the PoP gateway adjacent to the one or more load balancers or directors 1020 that are also located at the PoP gateway. All inbound data passing from end users to the PoP will first pass through the white-list firewall servers 1010 where it is screened according to a white-list before passing to one of the load balancers or directors 1020 which then decide which edge server of the PoP will be tasked with processing the inbound data.

The firewall servers 1010 each include a rendering engine 1030, security module 1040, and configuration repository 1050. As before, the rendering engine 1030 parses the inbound data to yield the DOM tree. The security module 1040 produces the white-list rendering of the data based on the DOM tree. The configuration repository 1050 stores the different white-list configurations for different firewall customizations.

In this integration scheme, the firewall servers 1010 may operate on independent machines, each having at least one processor, memory, and a storage medium. Alternatively, one firewall server 1010 may be configured to run on the same set of resources as a load balancer or director 1020 of the PoP.

FIG. 10 depicts the firewall server 1010 to be in front of the load balancer or director 1020. This allows the firewall server 1010 to screen the data before a routing decision is made by the load balancer or director 1020. In some other embodiments, the firewall server 1010 is deployed behind the load balancer or director 1020 such that a routing decision is made before the data is screened by the firewall server 1010.

Figure 11:
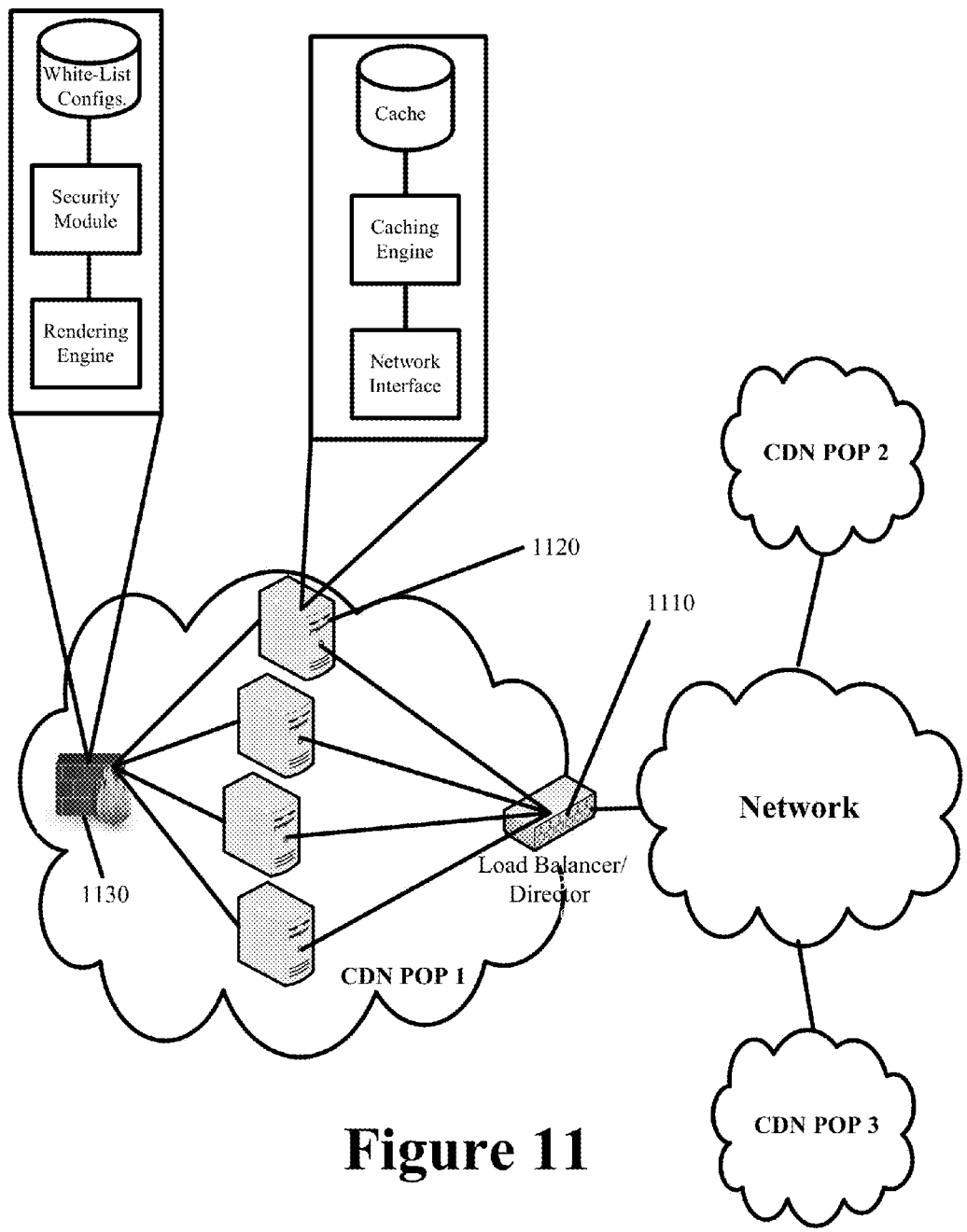
FIG. 11 provides a third integration scheme for incorporating the white-list firewall functionality within a CDN in accordance with some embodiments.

FIG. 11 provides a third integration scheme for incorporating the white-list firewall functionality within a CDN in accordance with some embodiments. In this figure, data first passes to the load balancer or director 1110. The load balancer or director 1110 then selects one edge server from amongst the edge servers 1120 of the PoP to process the data. However, before any edge server processes data, the edge server screens the data first with the firewall server 1130. The firewall server 1130 returns the screened data back to the edge server for processing.

Figure 12:
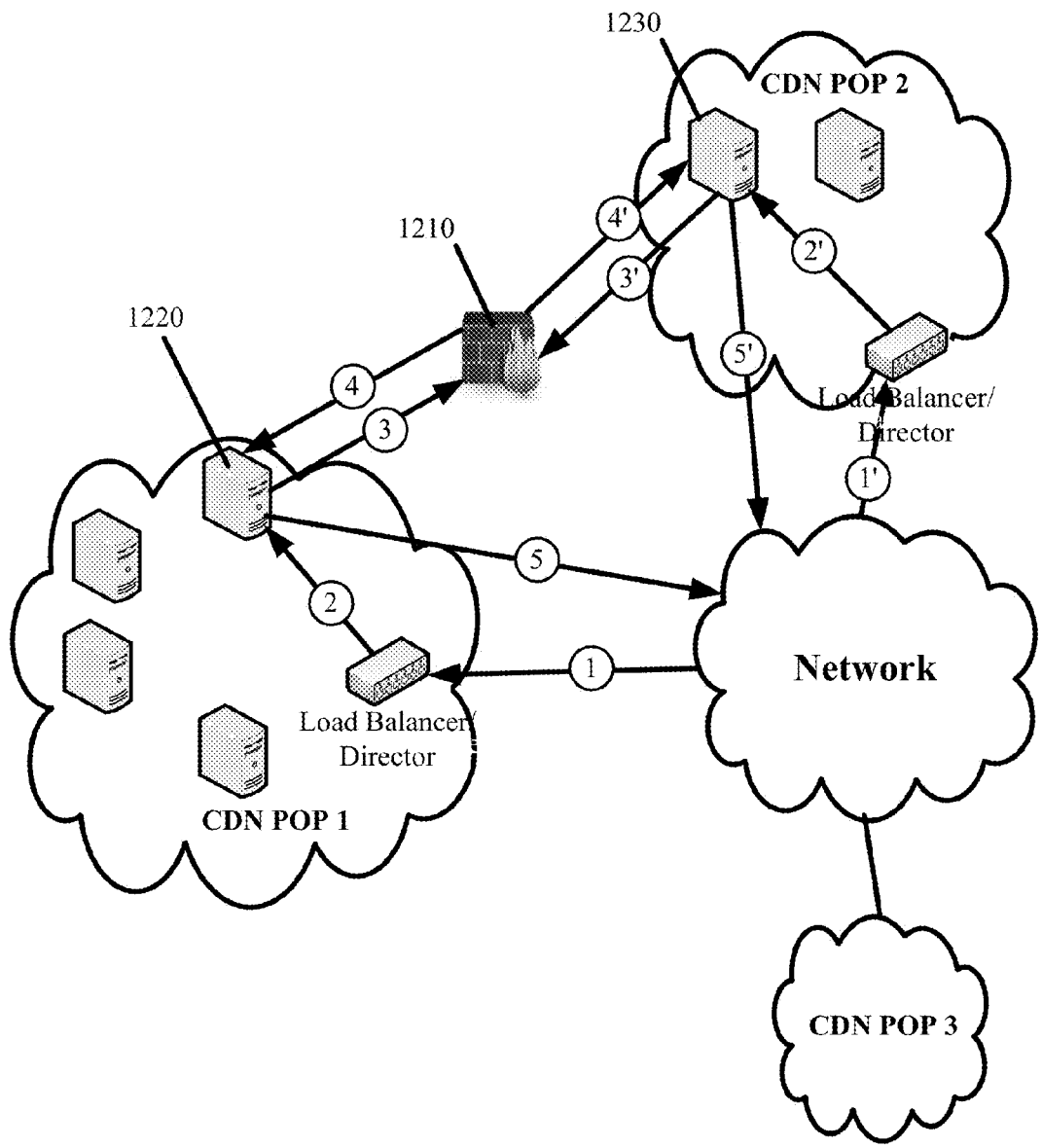
FIG. 12 provides a fourth integration scheme, whereby the firewall functionality is provided from outside the CDN network.

FIG. 12 provides a fourth integration scheme, whereby the firewall functionality is provided from outside the CDN network. In this integration scheme, firewall 1210 provides firewall functionality for caching servers 1220 and 1230 of two different CDN PoPs, wherein the firewall 1210 is located outside of each respective CDN PoP and the network of the CDN.

In the integration scheme of FIG. 12, the CDN caching servers 1220 and 1230 may issue requests to the firewall 1210 as needed, on a selective basis, or for all inbound and/or outbound data. The requests can be issued as Application Programming Interface (API) calls. The API calls can provide the data that is to be examined and any white-list and/or black-list rules for securing the data. In some embodiments, the firewall 1210 stores the white-list configurations and black-list rules and selectively applies them according to which content provider CDN customer the data is related to. In the integration scheme of FIG. 12, the firewall functionality can be operated by the CDN or by a third-party that enables the CDN access to the firewall functionality.

Figure 1:
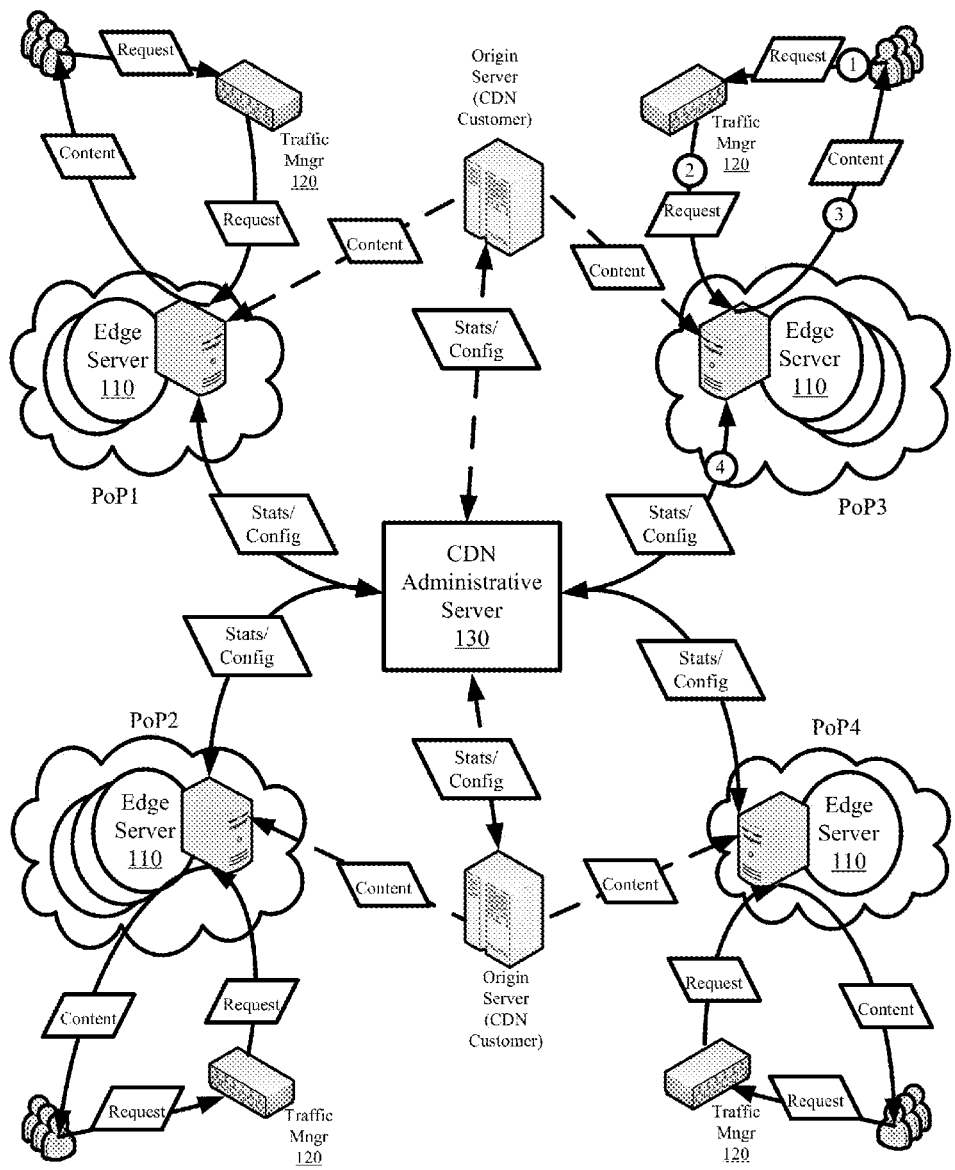
FIG. 1 depicts an exemplary Content Delivery Network (CDN) architecture.

In any of the integration schemes, the CDN may store all the customer specified configuration files centrally. With reference back to FIG. 1, the CDN administrative server 130 could be used to centrally store the configuration files. The CDN administrative server 130 can then be tasked with distributing the configuration files across the firewalls of the CDN. The distribution may occur periodically, when a new configuration file is loaded into the CDN, or a change is made to an existing configuration file. In some embodiments, the CDN administrative server 130 provides an interface with which a CDN customer specifies the white-list for the configuration file.

In each of the FIG. 9-12 configurations, the white-list firewalls are placed at the network edge. This allows the CDN to isolate and remove any threats at a point along that network path that is closest to the user initiating the threat. It further prevents the threat from propagating throughout the network, while isolating the CDN content provider customer origin servers from any harm. Without the firewall protection at the network edge, should the user provide updated data that contains malicious data elements and that data is processed by one edge server at a particular PoP, that edge server could then propagate the updated data containing the malicious data elements to other CDN PoPs such that all the PoPs are compromised. However, by placing the firewalls at each PoP, the threat is removed before it can be processed and spread.

IV. Server System

Many of the above-described functionality and components are implemented as software processes that are specified as a set of instructions recorded on a non-transitory computer readable storage medium (also referred to as computer readable medium). When these instructions are executed by one or more computational element(s) (such as processors or other computational elements like ASICs and FPGAs), they cause the computational element(s) to perform the actions indicated in the instructions. Server, computer, and computing machine are meant in their broadest sense, and can include any electronic device with a processor including cellular telephones, smartphones, portable digital assistants, tablet devices, laptops, notebooks, and desktop computers. Examples of computer readable media include, but are not limited to, CD-ROMs, flash drives, RAM chips, hard drives, EPROMs, etc.

Figure 13:
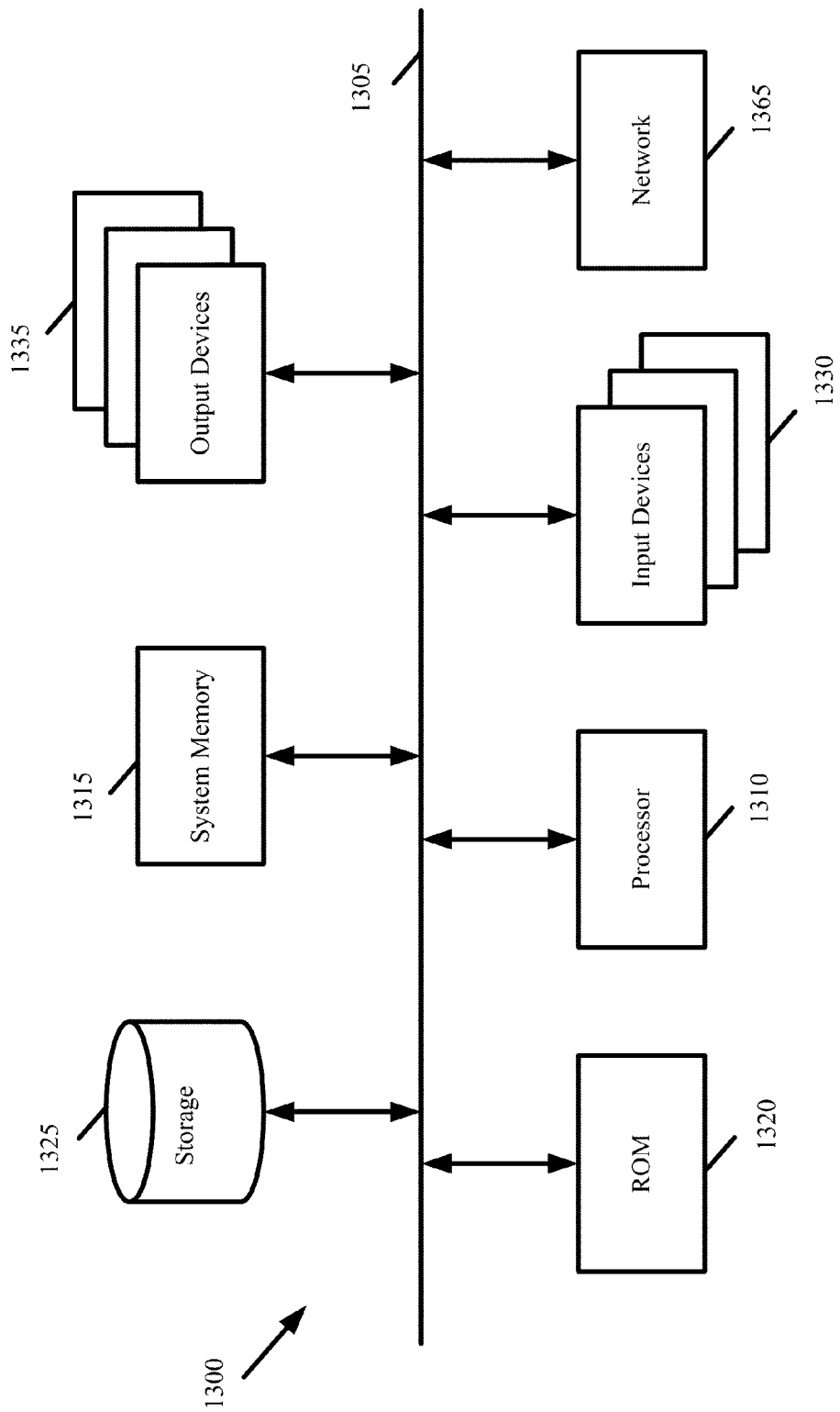
FIG. 13 illustrates a computer system or server with which some embodiments are implemented.

FIG. 13 illustrates a computer system or server with which some embodiments are implemented. Such a computer system includes various types of computer readable mediums and interfaces for various other types of computer readable mediums that implement the various processes and modules described above (e.g., targeted caching server, DNS servers, etc.). Computer system 1300 includes a bus 1305, a processor 1310, a system memory 1315, a read-only memory 1320, a permanent storage device 1325, input devices 1330, and output devices 1335.

The bus 1305 collectively represents all system, peripheral, and chipset buses that communicatively connect the numerous internal devices of the computer system 1300. For instance, the bus 1305 communicatively connects the processor 1310 with the read-only memory 1320, the system memory 1315, and the permanent storage device 1325. From these various memory units, the processor 1310 retrieves instructions to execute and data to process in order to execute the processes of the invention. The processor 1310 is a processing device such as a central processing unit, integrated circuit, graphical processing unit, etc.

The read-only-memory (ROM) 1320 stores static data and instructions that are needed by the processor 1310 and other modules of the computer system. The permanent storage device 1325, on the other hand, is a read-and-write memory device. This device is a non-volatile memory unit that stores instructions and data even when the computer system 1300 is off. Some embodiments of the invention use a mass-storage device (such as a magnetic or optical disk and its corresponding disk drive) as the permanent storage device 1325.

Other embodiments use a removable storage device (such as a flash drive) as the permanent storage device Like the permanent storage device 1325, the system memory 1315 is a read-and-write memory device. However, unlike storage device 1325, the system memory is a volatile read-and-write memory, such as random access memory (RAM). The system memory stores some of the instructions and data that the processor needs at runtime. In some embodiments, the processes are stored in the system memory 1315, the permanent storage device 1325, and/or the read-only memory 1320.

The bus 1305 also connects to the input and output devices 1330 and 1335. The input devices enable the user to communicate information and select commands to the computer system. The input devices 1330 include alphanumeric keypads (including physical keyboards and touchscreen keyboards), pointing devices (also called "cursor control devices"). The input devices 1330 also include audio input devices (e.g., microphones, MIDI musical instruments, etc.). The output devices 1335 display images generated by the computer system. The output devices include printers and display devices, such as cathode ray tubes (CRT) or liquid crystal displays (LCD).

Finally, as shown in FIG. 13, bus 1305 also couples computer 1300 to a network 1365 through a network adapter (not shown). In this manner, the computer can be a part of a network of computers (such as a local area network ("LAN"), a wide area network ("WAN"), or an Intranet, or a network of networks, such as the Internet.

As mentioned above, the computer system 1300 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A firewall for protecting against security threats, the firewall comprising: at least one non-transitory computer-readable storage medium comprising instructions that, when executed by at least one processor of the firewall, are operable to:
    produce a Document Object Model (DOM) tree comprising a plurality of nodes representing a plurality of data elements for data that is received at the firewall and that is intended for a recipient behind the firewall;
    render the DOM tree, wherein rendering the DOM tree comprises (i) executing any DOM tree nodes containing executable data elements of the data such that any security threats harbored within the executable data elements are effectuated against the firewall and (ii) formatting any DOM tree nodes containing non-executable data elements of the data to produce render output that simulates a webpage presentation of the data;
    reconstruct the data from the render output to produce reconstructed data, wherein the reconstructed data comprises output resulting from execution of the executable data elements in place of the executable data elements that were originally included as part of said data; and
    pass the reconstructed data from the firewall to the intended recipient.

2. The firewall of claim 1, wherein each node of the plurality of nodes hierarchically organizes a different data element of the plurality of data elements.

3. The firewall of claim 2, wherein the at least one computer-readable non-transitory storage medium further comprises instructions that, when executed by the at least one processor, are operable to parse the data and hierarchically organize the plurality of data elements to the plurality of nodes.

4. The firewall of claim 1, wherein the executable data elements are embedded with at least one security threat and producing, in part, the render output from the outputs of the effectuated executable data elements nullifies the security threat for the recipient.

5. The firewall of claim 1, wherein the instructions to render the DOM tree comprise instructions that, when executed by the at least one processor, are operable to apply at least one rule against the reconstructed data to identify whether the reconstructed data contains any security threats recognized by the at least one rule.

6. A method of guarding against attacks using a white-list, the method operable in a Content Delivery Network (CDN) that provides content delivery on behalf of plurality of content provider CDN customers, the method comprising:
    with at least one computer operated as a firewall by the CDN and including at least one processor, receiving a plurality of white-list configurations, each white-list configuration specified by a different content provider CDN customer of the plurality of content provider CDN customers;
    receiving at the firewall, data targeting content of a specific content provider CDN customer of the plurality of content provider CDN customers;
    identifying from the plurality of white-list configurations, a specified white-list configuration that is specified by the specific content provider CDN customer by identifying that the data targets content of the specific content provider CDN customer;
    evaluating the data using the specific white-list configuration, wherein the data comprises a plurality of data elements, and wherein a first set of the plurality of data elements are white-listed in the specific white-list configuration for approved passage through the firewall;
    passing the first set of the plurality of data elements through the firewall while blocking a second set of the plurality of data elements that are not white-listed in the specific white-list configuration.

7. The method of claim 6, wherein evaluating the first data comprises producing a DOM tree comprising a first plurality of nodes hierarchically organizing the plurality of data elements.

8. The method of claim 7, wherein evaluating the data further comprises identifying a set of the first plurality of nodes that are included in the specific white-list configuration and white-listing the first set of data elements that are hierarchically organized to the set of nodes.

9. The method of claim 6, wherein the data is first data and the specific content provider CDN customer is a first content provider CDN customer, the method further comprising evaluating second data targeting content of a second content provider CDN customer of the plurality of content provider CDN customers by rendering the second data through the DOM when no white-list configuration is specified by the second content provider CDN customer, wherein rendering the second data through the DOM produces a webpage representation of the second data that is reconstructed and passed through the firewall instead of the second data.

10. The method of claim 9, wherein the webpage representation includes outputs of executable elements from the second data without including the executable elements, wherein the outputs are produced as a result of rendering the second data through the DOM.

11. A Content Delivery Network (CDN) comprising:
    a plurality of Points-of-Presence (PoPs) distributed across a plurality of geographic regions, each PoP of the plurality of PoPs comprising:
    at least one caching server comprising at least one non-transitory computer-readable storage medium storing instructions that, when executed by at least one processor of the caching server, are operable to perform content delivery on behalf of a plurality of content provider customers of the CDN;

at least one firewall screening data that is intended for processing by a particular caching server of the at least one caching server, the firewall comprising at least one non-transitory computer-readable storage medium storing instructions that, when executed by at least one processor of the firewall, are operable to:

identify a particular white-list configuration from a plurality of white-list configurations by identifying that the data targets content of a particular content provider CDN customer of the plurality of content provider CDN customers;

produce a DOM representation of the data;

generate a white-list rendering of the data from the DOM representation using the particular white-list configuration; and forward the white-list rendering of the data to the particular caching server for processing.

12. The CDN of claim 11, wherein each PoP further comprises a load balancer, wherein the load balancer receives the white-list rendering of the data from the firewall and selects the particular caching server from the at least one caching server to process the white-list rendering of the data.

13. The CDN of claim 11, wherein each PoP further comprises a load balancer, wherein the load balancer selects the particular caching server from the at least one caching server to process the data.

14. The CDN of claim 13, wherein the load balancer passes the data to the firewall for filtering and subsequent forwarding of the white-list rendering of the data to the particular caching server.

15. The CDN of claim 11, wherein the particular caching server receives the data and passes the data to the at least one firewall for said identifying, producing, generating, and forwarding prior to processing by the particular caching server.

16. The CDN of claim 11, wherein the non-transitory computer-readable storage medium of the firewall further comprises instructions that, when executed by at least one processor of the firewall, are operable to apply a black-list rule to evaluate the white-list rendering of the data prior to said forwarding, wherein the black-list rule is defined to identify at least one security threat.

17. The CDN of claim 11, wherein the DOM representation comprises a plurality of nodes that hierarchically organize a plurality of data elements of the data, and wherein generating the white-list rendering of the data comprises instructions that, when executed by at least one processor of the firewall, are operable to traverse the DOM representation and produce the white-list rendering from a set of the plurality of data elements that are hierarchically organized to a set of the plurality nodes that are listed in the particular white-list configuration.

18. The CDN of claim 11, wherein producing the DOM tree representation comprises instructions that, when executed by at least one processor of the firewall, are operable to parse the data into a plurality of data elements and hierarchically organize the plurality of data elements to a plurality of nodes of the DOM tree.

19. The CDN of claim 11, wherein generating the white-list rendering of the data comprises instructions that, when executed by at least one processor of the firewall, are operable to produce a webpage representation of the data in which outputs of executable elements of the data are included in the webpage representation in place of the executable elements.

20. A computer-implemented method of guarding against digital security threats, the computer-implemented method comprising:

with at least one computer operating as a firewall and including at least one processor, receiving data that is related to content of a particular content provider CDN customer of a plurality of content provider CDN customers, wherein the data is comprises of a plurality of data elements;

producing a Document Object Model (DOM) tree representation of the data, the DOM tree representation comprising a plurality of nodes that hierarchically organize the plurality of data elements;

determining whether a particular white-list from a plurality of white-lists is specified by the particular content provider CDN customer after having identified that the data targets content of the particular content provider CDN customer;

producing render output for the data, wherein producing the render output comprises:

(i) reconstructing the data from a set of the plurality of nodes that are identified in the white-list when the white-list is specified by the particular content provider CDN customer;

(ii) reconstructing the data from a set of the plurality of data elements that compose a webpage representation of the data as a result of rendering the DOM tree representation when the white-list is not specified by the particular content provider CDN customer; and passing the render output through the firewall in place of the data.

21. The computer-implemented method of claim 20 further comprising applying a black-list rule to evaluate the render output prior to said passing, wherein the black-list rule is defined to identify at least one security threat.

\* \* \* \* \*